US012624541B2

(12) United States Patent
Lim

(10) Patent No.: US 12,624,541 B2
(45) Date of Patent: May 12, 2026

(54) BUILDING SYSTEM

(71) Applicant: NXT BUILDING SYSTEM PTY LTD, Canning Vale (AU)

(72) Inventor: Matakii Lim, Canning Vale (AU)

( * ) Notice: Subject to any disclaimer, the term of this patent is extended or adjusted under 35 U.S.C. 154(b) by 140 days.

(21) Appl. No.: 17/999,919

(22) PCT Filed: May 24, 2021

(86) PCT No.: PCT/AU2021/050487
§ 371 (c)(1),
(2) Date: Nov. 26, 2022

(87) PCT Pub. No.: WO2021/237275
PCT Pub. Date: Dec. 2, 2021

(65) Prior Publication Data

US 2023/0203800 A1 Jun. 29, 2023

(30) Foreign Application Priority Data

May 27, 2020 (AU) ................................ 2020901731

(51) Int. Cl.
*E04B 1/04* (2006.01)
*B28B 23/02* (2006.01)
(Continued)

(52) U.S. Cl.
CPC .............. *E04B 1/043* (2013.01); *B28B 23/02* (2013.01); *E04B 1/41* (2013.01); *E04B 5/04* (2013.01); *E04B 7/20* (2013.01); *E04B 2001/389* (2023.08)

(58) Field of Classification Search
CPC ... E04B 1/043; E04B 1/41; E04B 5/04; E04B 7/20; E04B 2001/389; E04B 1/34321;
(Continued)

(56) References Cited

U.S. PATENT DOCUMENTS 3,258,888 A * 7/1966 Lum ........................ E04B 1/383 52/309.3
3,826,051 A * 7/1974 Miller .................. B29C 67/245 52/274
(Continued)

FOREIGN PATENT DOCUMENTS

CN 108035433 A 5/2018
CN 107299678 A 8/2019
(Continued)

*Primary Examiner* — Omar F Hijaz
(74) *Attorney, Agent, or Firm* — Blanchard Horton PLLC

(57) ABSTRACT

The present invention relates to a building system for erecting a building structure. The building system comprises a plurality of precast transportable concrete wall panels; each wall panel comprising a reinforcement structure and a plurality of cast-in connecting inserts, each connecting insert being located at a predetermined position; and a precast transportable concrete floor panel, the floor panel also comprising a reinforcement structure and a plurality of cast-in connecting inserts, each being located at a pre-determined position, the floor panel further comprising a recess along at least a portion of a perimeter of the floor panel. The building system is configured such that when each precast wall panel is positioned in a substantially upright position in the recess of the floor panel, connecting inserts of two adjacent panels align so that the panels can be connected using a plurality of mechanical fasteners.

10 Claims, 13 Drawing Sheets

(51) Int. Cl.

| | |
|---|---|
| ***E04B 1/38*** | (2006.01) |
| ***E04B 1/41*** | (2006.01) |
| ***E04B 5/04*** | (2006.01) |
| ***E04B 7/20*** | (2006.01) |

(58) Field of Classification Search

CPC .. E04B 2001/4192; E04B 1/04; E04B 1/4121; E04B 5/02; B28B 23/02; E02D 27/016; E04H 1/02; E04H 1/1205; E04C 2/044; E04C 2/06

See application file for complete search history.

(56) References Cited

U.S. PATENT DOCUMENTS

| | | | | | |
|---|---|---|---|---|---|
| 4,942,707 | A * | 7/1990 | Huettemann | E04C 2/288 | 264/32 |
| 5,359,816 | A * | 11/1994 | Iacouides | E04B 1/0007 | 52/236.7 |
| 5,487,241 | A * | 1/1996 | Gorrell | E04B 1/043 | 52/92.1 |
| 5,491,948 | A * | 2/1996 | Harris | E04C 2/06 | 52/250 |
| 5,761,862 | A | 6/1998 | Hendershot et al. | | |
| 7,021,014 | B1 | 4/2006 | Wolfe et al. | | |
| 7,124,545 | B1 * | 10/2006 | Poma | E04B 1/355 | 52/293.3 |
| 8,590,215 | B2 * | 11/2013 | Damichey | E04B 1/04 | 52/584.1 |
| 8,875,459 | B2 * | 11/2014 | Palmeri | E04B 7/04 | 52/774 |
| 2022/0074206 | A1 * | 3/2022 | Tadros | E04C 2/06 | |

FOREIGN PATENT DOCUMENTS

| | | | | |
|---|---|---|---|---|
| CN | 110145133 | A | 8/2019 | |
| ES | 2230921 | A1 * | 5/2005 | E04B 1/34846 |
| WO | 2015154132 | A1 | 10/2015 | |
| WO | 2019144211 | A1 | 8/2019 | |
| WO | 2020096526 | A1 | 5/2020 | |

* cited by examiner

BUILDING SYSTEM

CROSS-REFERENCE TO RELATED APPLICATIONS

This application is a U.S. national phase under 35 U.S.C. § 371 of International Patent Application No. PCT/AU2021/050487 filed May 24, 2021, and claims the priority of Australian Patent Application No. AU 2020901731 filed May 27, 2020. The disclosures of all such applications are hereby incorporated herein by reference in their respective entireties, for all purposes.

TECHNICAL FIELD

The present invention relates to a building system for erecting a building structure and a method of making and assembling the building system to erect the building structure.

BACKGROUND

The process of erecting a building structure is typically a costly and cumbersome exercise.

Prefabricated building structures are building structures that include components that are manufactured off-site and, prior to the process of erecting the building structure, the components are taken to a building site. The components are typically made in a factory and shipped to the building site. At the building site, the components are assembled together to erect the building structure. However, with conventional prefabricated building structures, there may still be a lot of on-site manufacturing and wet work involved to erect the building structure and make the building structure structurally sound.

The process of assembling the components of a conventional prefabricated building structure on-site typically are a cumbersome process and requires skilled labour as well as specialised machinery. This increases the cost for erecting the building structure.

It would be advantageous if embodiments of the present invention would simplify the process of manufacturing and assembling the building system to erect the building structure or at least provide an alternative to conventional prefabricated building structures.

Any discussion of documents, acts, materials, devices, articles or the like which have been included in the present specification is not to be taken as an admission that any or all of these matters form part of the prior art base or were common general knowledge in the field relevant to the present disclosure as it existed before the priority date of each claim of this application.

Throughout the specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

SUMMARY

Embodiments of the present invention relate to a building system for erecting a building structure, the building system comprising:

a plurality of precast transportable concrete wall panels; each wall panel comprising a reinforcement structure and a plurality of cast-in connecting inserts, each connecting insert being located at a predetermined position; and a precast transportable concrete floor panel, the floor panel also comprising a reinforcement structure and a plurality of cast-in connecting inserts, each being located at a pre-determined position, the floor panel further comprising a recess along at least a portion of a perimeter of the floor panel; and wherein the building system is configured such that when each precast wall panel is positioned in a substantially upright position in the recess of the floor panel, connecting inserts of two adjacent panels align so that the panels can be connected using a plurality of mechanical fasteners.

Embodiments of the present invention provide significant advantages. In particular, by providing a recess along at least a portion of the perimeter of the floor panel, the wall panels can be precisely positioned when the building structure is erected. Even more so, this particular configuration may assist in water proofing of the building structure as water is restricted from entering an internal cavity of the building structure. Also, by positioning the connecting inserts of the panels at predetermined positions to substantially align when the building structure is erected enables a simplified process of erecting the building structure.

Furthermore, by providing the floor panel and the wall panels as pre-cast transportable concrete panels, erection of the building structure can be simplified. Moreover, transport of components of the building structure may be improved as the panels can be transported in a flat pack.

In one embodiment, the recess of the floor panel has a width that is substantially identical to a width of the connecting wall panel. This has the advantage that the wall panels can easily be positioned to ensure the correct alignment of the connecting inserts for connecting the panels to each other using mechanical fasteners.

In an embodiment, a connecting insert may comprise an attachment for attaching the insert to a support structure, wherein the support structure is attachable to the casting bed in which the panel is cast. In this way, precise positioning of the connecting inserts at the predetermined positions can be ensured. The casting bed may be provided with a plurality of support structures, each being attachable to a side portion of the casting bed.

In one embodiment, a plurality of connecting inserts of the floor panel and/or a wall panel are in the form of threaded inserts having a closed end. The threaded inserts with closed ends may be located at an internal surface of the formed building structure. In a particular embodiment, a cast-in threaded insert may comprise an enlarged footing. Such threaded inserts are also referred to as elephant ferrules. Elephant ferrules have the advantage of improved stability when cast into a concrete panel.

In addition, a plurality of connecting inserts of the floor panel and/or a wall panel may be in the form of apertures extending through the panel. An aperture may or may not be threaded.

For example, the floor panel may comprise a plurality of threaded inserts with a closed end, and a wall panel to be connected to the floor panel may comprise a plurality of connecting inserts in the form of apertures, each extending through the wall panel, wherein the building system is configured such that when the building structure is erected, an aperture of the wall panel aligns with a threaded insert of the floor panel for receiving a fastener thereby connecting the wall panel to the floor panel. In an alternatively example, the floor panel may comprise a plurality of apertures and the wall panel may comprise a plurality of threaded inserts with a closed end. Additionally or alternatively, a first wall panel may comprise a plurality of threaded inserts with a closed end, and a second wall panel to be connected to the first panel may comprise a plurality of connecting inserts in the form of apertures, each extending through the second wall panel, wherein the building system is configured such that when the building structure is erected, an aperture of the second wall panel aligns with a threaded insert of the first wall panel for receiving a fastener thereby connecting the wall panels to each other.

In a further embodiment, the building system may comprise a plurality of connecting brackets, such as angle brackets, for receiving the fasteners. In a specific embodiment, the plurality of brackets to connect the pre-cast concrete panels may be identical. This has the significant advantage that manufacturing of the components of the building structure as well as erecting the building structure can be simplified. In an embodiment, each connecting bracket comprises two plates with at least one aperture for receiving a respective fastener. The at least one aperture may be in the form of a slot or comprises a larger diameter to account for some tolerance.

In this embodiment, a plurality of connecting inserts of the floor panel and a plurality of connecting inserts of the wall panels may be in the form of threaded inserts having a closed end, and the building system may be configured such that when the building structure is erected, a threaded insert of the floor panel and a threaded insert of a wall panel align with a connecting bracket thereby connecting the wall panel to the floor panel. Additionally or alternatively, first and second wall panels may comprise a plurality of connecting inserts in the form of threaded inserts with a closed end, and the building system may be configured such that when the building structure is erected, threaded inserts of the first and second wall panels algin with a connecting bracket for receiving mechanical fasteners, thereby connecting the panels to each other.

A person skilled in the art will appreciate that the building system may utilise a combination of the above-described connection methods. In these embodiments, the predetermined position of each of the plurality of connecting inserts provides the advantage of a simplified assembling of the building structure.

In an embodiment, the precast floor panel comprises one or more recessed areas, for example, located at a centre portion of the panel. In one example, the one or more recessed areas may extend over a majority of the floor panel surface. In this way, the floor panel may be characterised by an enlarged perimeter with reduced weight. In a specific embodiment, the pre-cast floor panel comprises one or more structural ribs arranged to extend through the one or more recessed areas. In this way, a strength of the panel can be increased. The one or more structural ribs may extend along the same direction. Alternatively, the one or more structural ribs may form a grid-like structure.

In an embodiment, the precast floor panel may comprise a displacement element within the one or more recessed areas. For example, the displacement element may be positioned within the casting bed to provide the recessed area within the panel. The displacement element may subsequently be removed or may remain within the floor panel. The displacement element may be made from a lightweight material and/or an insulating material. For example, the displacement element may be in the form of a foam element.

In an embodiment, the building system may further comprise a roof panel, wherein the building system is configured such that when the building structure is erected, the roof panel is supported on top portions of the plurality of wall panels.

The roof panel may be configured to form a lid that partially fits over the top portions of the plurality of wall panels. Specifically, the roof panel may comprise a projecting flange extending along the perimeter of the roof panel.

In a specific embodiment, the roof panel is a pre-cast transportable concrete roof panel that comprises a reinforcement structure and a plurality of cast-in connecting inserts for connecting the roof panel to the wall panels, each connecting insert being located at a predetermined position, wherein the building system is configured such that when each precast wall panel is positioned in a substantially upright position in the recess of the floor panel, connecting inserts of the roof panel align with connecting inserts of the wall panel so that the roof panel can be connected to the wall panels using a plurality of mechanical fasteners.

In one embodiment, the cast-in connecting inserts of the roof panel may be threaded inserts with a closed end, such as elephant ferrules. The threaded inserts may be located at an inner surface of the roof panel when the building structure is erected. Specifically, the threaded inserts may be located at the projecting flange extending along the perimeter of the roof panel.

The pre-cast concrete roof panel may comprise one or more recessed areas. This has the particular advantage that a weight of the roof panel can be reduced. In a specific embodiment, the pre-cast roof panel comprises one or more structural ribs extending through the one or more recessed areas. In this way, strength of the roof panel can be improved. The one or more structural ribs may extend along the same direction. Alternatively, the one or more structural ribs may form a grid-like structure within the recessed area.

The building system may be configured such that the recessed area of the roof panel rests on a top edge of each of the plurality of wall panels. This has the particular advantage that an overlap is formed which may assist in water proofing the roof of the building structure. Alternatively, the precast concrete roof panel may comprise a groove for receiving the top edge of the plurality of wall panels.

Specifically, the one or more recessed areas may be arranged to define a projecting flange along the perimeter of the roof panel such that when the building system is assembled, the projecting flange may extend along a portion of an external surface of the wall panels.

In one embodiment, the building system is configured such that when the building structure is erected, an external surface of the roof is sloped. For example, an angle of the sloped surface may be between 1° and 10°, in particular between 1° and 5°, in particular between 2° and 3°, or approximately 1°, 2°, 3°, 4°, or 5°.

In the embodiment in which an external surface of the roof is sloped, the roof panel may be configured such that a direction of the side walls of the floor panel relative to the main face of the roof panel defines an angle of the slope. In the specific embodiment in which the roof panel comprises a projecting flange, a direction of the projecting flange may define the angle of the slope.

In an embodiment, each wall panel may comprise one or more recessed spaces for receiving a plate of a connecting bracket that connects the wall panel to the floor panel. In this way, a portion of the connecting bracket can be concealed when the building structure is erected.

Embodiments of the present invention relate to a method of making a building system for erecting a building structure, the method comprising the steps of:

- providing a casting bed configured to fabricate a transportable concrete wall panel;
- positioning a reinforcement structure in the casting bed;
- positioning a plurality of connecting inserts relative to the casting bed such that when the wall panel is cast, each of the threaded inserts is located at a predetermined position within the wall panel;
- pouring concrete into the casting bed to cast the wall panel;
- repeating the foregoing steps to provide a plurality of precast transportable concrete wall panels for the building structure;
- providing a casting bed configured to fabricate a transportable concrete floor panel, the casting bed comprising at least one displacement element for defining a recess along at least a portion of a perimeter of the casted floor panel;
- positioning a reinforcement structure in the casting bed;
- positioning a plurality of connecting inserts relative to the casting bed such that when the floor panel is cast, each of the threaded inserts is located at a predetermined position within the floor panel; and
- pouring concrete into the casting bed to cast the floor panel;
- wherein the method is conducted such that each precast wall panel can be positioned in a substantially upright position in the recess of the floor panel and when the building structure is erected, cast-in connecting inserts of two adjacent panels align so that the panels can be connected to each other using a plurality of mechanical fasteners.

In an embodiment, the method may comprise:

- providing at least one support structure for positioning the plurality of connecting inserts at the respective predetermined positions within the casted panel,
- attaching one or more of the plurality of connecting inserts to the at least one support structure, and
- attaching the at least one support structure to the casting bed so that the connecting inserts are cast-in at the predetermined positions.

The at least one support structure may allow for the precise positioning of the connecting inserts within the panel when the panel is cast. For example, at least one support structure may be provided to attach to a side portion of the casting bed.

In an embodiment, the method may comprise providing at least one further displacement element for attaching to one or more of the casting beds to define structural features within the panels. For example, at least one displacement element may be attached to the casting bed to define one or more recessed areas within the floor panel and/or the roof panel and/or a wall panel. The displacement element may be removed or alternatively remains within the recessed area for insultation purposes. An exemplary displacement element may be made of a lightweight material, such as foam. However, other suitable displacement elements are envisaged.

In an embodiment, the method may comprise:

- providing a casting bed configured to fabricate a transportable concrete roof panel;
- positioning a reinforcement structure in the casting bed;
- positioning a plurality of connecting inserts relative to the casting bed such that when the roof panel is cast, each of the threaded inserts is located at a predetermined position within the roof panel; and
- pouring concrete into the casting bed to cast the roof panel;

The method may further comprise providing at least one displacement element for attaching to the casting bed to define one or more recessed areas within the roof panel. The at least one displacement element may be configured to define a projecting flange along the perimeter of the roof panel.

In one specific embodiment, the method may comprise:

- providing a first displacement element and attaching the first displacement element to a first side of the casting bed configured to fabricate the concrete roof panel;
- providing a second displacement element and attaching the second displacement element to a second side portion of the casting bed configured to fabricate the concrete roof panel, the second side being opposite of the first side;
- wherein the method is conducted such that the first and second displacement elements modify an angle of the sides of the roof panel thereby defining a slope of the roof panel when the building structure is erected.

By using the displacement elements to modify an angle of the sides of the roof panel, the roof panel can be provided with an in-built slope. Even more so, there is no need for a complex casting bed in which concrete may need to be poured at an angle to provide the slope. Instead, the slope is formed by modifying the side portions of the panel.

Embodiments of the present invention further relate to a method of assembling the building system as described above, the method comprising:

- positioning the precast transportable concrete floor panel;
- positioning a precast transportable concrete wall panel in the recess of the floor panel such that the wall panel extends in a substantially upright position;
- providing a temporary support element to support the wall panel in the substantially upright position;
- connecting the wall panel to the floor panel by fastening one or more mechanical fasteners to the aligned connecting inserts of adjacent panels;
- repeating the forgoing steps for the plurality of wall panels; and
- removing the temporary support elements.

The precast concrete floor panel may be positioned on a foundation, such as one or more footings. The footings may also be precast. In this example, the method may comprise a step of positioning a plurality of footings at predetermined positions to align with the precast concrete floor panel.

The method may further comprise providing a roof panel for positioning on the plurality of wall panels. For example, the roof panel may also be a precast roof panel including a plurality of cast-in connecting inserts.

BRIEF DESCRIPTION OF DRAWINGS

Certain exemplary embodiments of the invention will now be described with reference to the accompanying drawings in which.

DESCRIPTION OF EMBODIMENTS

Figure 1:
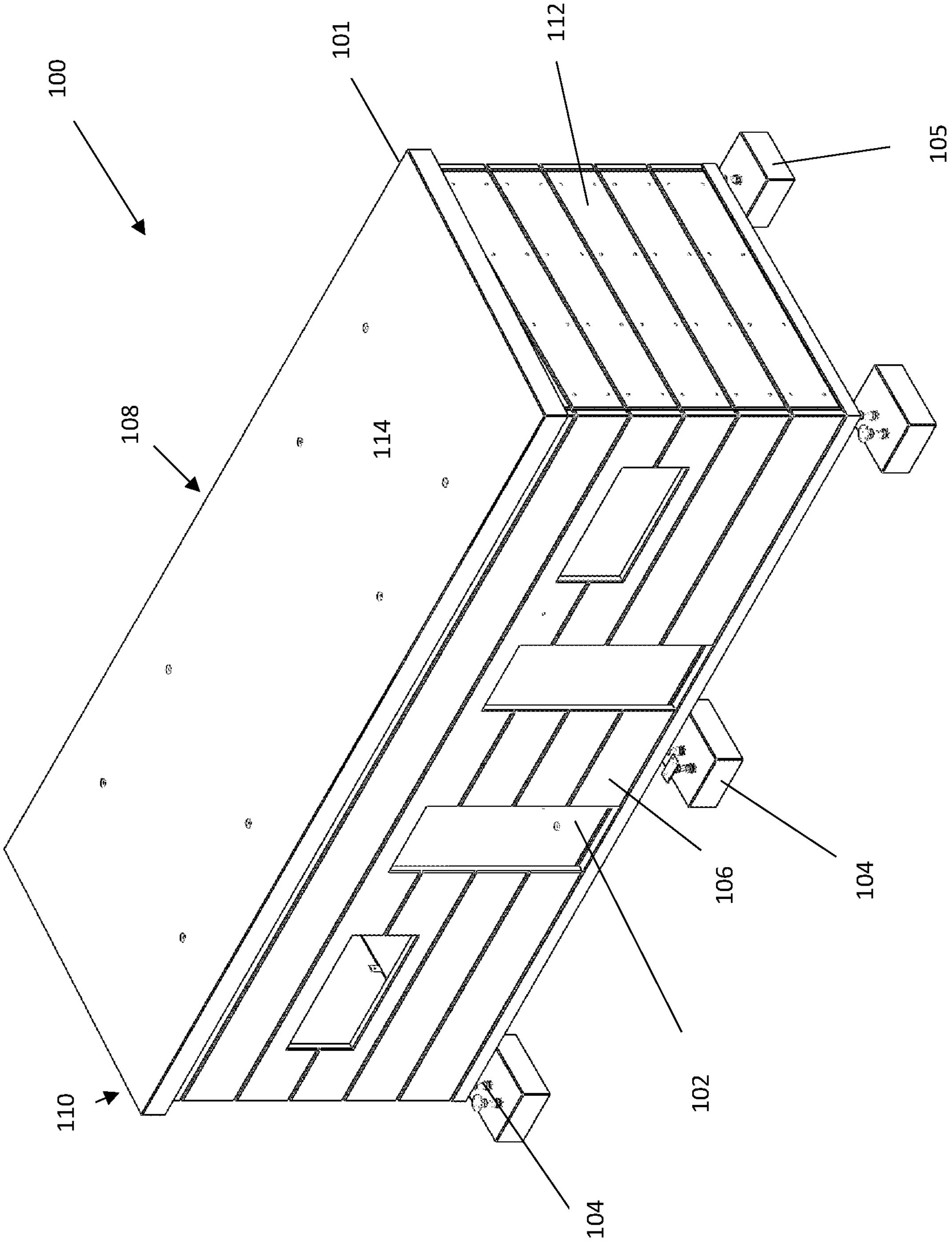
FIG. 1 is a schematic representation of a pre-fabricated building structure in accordance with an embodiment of the present invention.

Embodiments of the present invention generally relate to a building system for erecting a building structure having transportable components that are precast and typically fabricated off-site. The components are then transported to a building site where the building structure can be assembled. Embodiments of the present invention further relate to a method of making and assembling the building system to erect the building structure.

The building system for erecting a building structure in accordance with embodiments of the present invention generally comprise a plurality of precast and transportable concrete wall panels, wherein each wall panel comprises a reinforcement structure and a plurality of cast-in connecting inserts for receiving respective fasteners. Each connecting insert is located at a predetermined position which is defined to align with a connecting insert of an adjacent wall panel so that the adjacent wall panels can be connected using a mechanical fastener, such as a bolt and/or a connecting bracket. The building system further comprises a precast and transportable concrete floor panel, wherein the floor panel also comprises a reinforcement structure and a plurality of cast-in connecting inserts that are located at pre-determined positions. Again, the predetermined positions are defined so that the connecting inserts of the floor panel align with connecting inserts of the wall panels. In this way, the floor panel can be connected to the floor panels using mechanical fasteners.

The floor panel comprises a recess along at least a portion of a perimeter of the floor panel. Specifically, the recess typically extends along the perimeter of the floor panel where the plurality of wall panels are to be connected to the floor panel. A person skilled in the art will appreciate that the recess may extend along the entire perimeter of the floor panel or solely along the portions where a wall panel is placed. For example, a recess may not be required where a door of the building structure is located.

Embodiments of the present invention provide significant advantages. In particular, the building system may simplify the assembling process to erect the building structure. This is achieved, amongst others, by providing a recess along a perimeter of the floor panel. The wall panels can thereby be precisely positioned within the recess when the building structure is erected. Even more so, this particular configuration may assist in water proofing of the building structure. This is due to the provision of the recess which restricts water or any other liquid from entering the internal space of the building structure. In addition, water or any other liquid may still exit the internal space of the building structure via the recess, in particular during the assembling process.

Furthermore, most components of the building system, in particular the precast transportable components, can be transported in a flat pack since at least the floor and wall panels are precast and can be stacked on top of one another. Thus, a transport volume can be minimised which may reduce transport costs. Even more so, the way of connecting the panels with each other to erect the building structure may reduce or even eliminate the need for skilled workers or specialised machineries. This is achieved by positioning the connecting inserts at the predetermined positions during the casting process as will be described further below. The main steps of assembling the building structure are preferably achieved by using mechanical fasteners, such as screws and bolts. As such, there may be no need for welding any parts of the building system or using wet components at the building site. More advantages will become apparent in the description of a specific embodiment of the present invention with reference to the accompanying drawings.

Referring initially to FIG. 1, there is illustrated a building system 100 for erecting a building structure 101. In this drawing, a majority of the precast components of the building system 100 have been assembled showing the erected building structure 101. In this particular embodiment, the building system 100 comprises a precast transportable concrete floor panel 102 that is supported on a plurality of footings 104, 105. The building system 100 further comprises a precast transportable concrete front wall panel 106, a precast transportable concrete back wall panel 108 (not shown) and opposite precast transportable concrete side wall panels 110, 112. In this example, the building system 100 further comprises a precast transportable concrete roof panel 114. However, a person skilled in the art will appreciate that other concrete or non-concrete roof panels are envisaged. A conventional roof panel may, for example, be advantageous for larger building structures.

As the aforementioned panels are precast concrete panels, the panels are fabricated off-site and then transported to a building site where the building structure 101 is erected. The inventors of the present invention have found significant advantages in providing a building system 100 as shown in FIG. 1. Specifically, erecting a building structure 101 as shown in FIG. 1 including a fit out may be completed within 24 hours, for example in 3×8-hour shifts. This can be achieved by ensuring that all connecting inserts are at the predetermined positions so that all panels fit together when the building structure 101 is assembled. A further advantage is that the precast concrete wall panels may be prefinished and therefore may not require any painting or the like. Another significant advantage of the building system 100 is that most components can be transported in a flatpack.

Further, the inventors of the present invention have found that by providing all panels of concrete, the panels have a relatively high strength and fire rating. Even more so, due to the way the panels are being connected to each other, water proofing can be improved while keeping the complexity of the building system at a relatively low level. This allows for the building structure 101 to be erected by non-skilled workers and without the need for special machinery.

In this particular example, each wall panel defines one storey or level of the erected building structure 101. However, a person skilled in the art will appreciate that one wall panel may expand over multiple storeys or levels of a building structure. For example, a wall panel may have a size and shape such that the wall panel has a height that extends along two levels.

Figure 2:
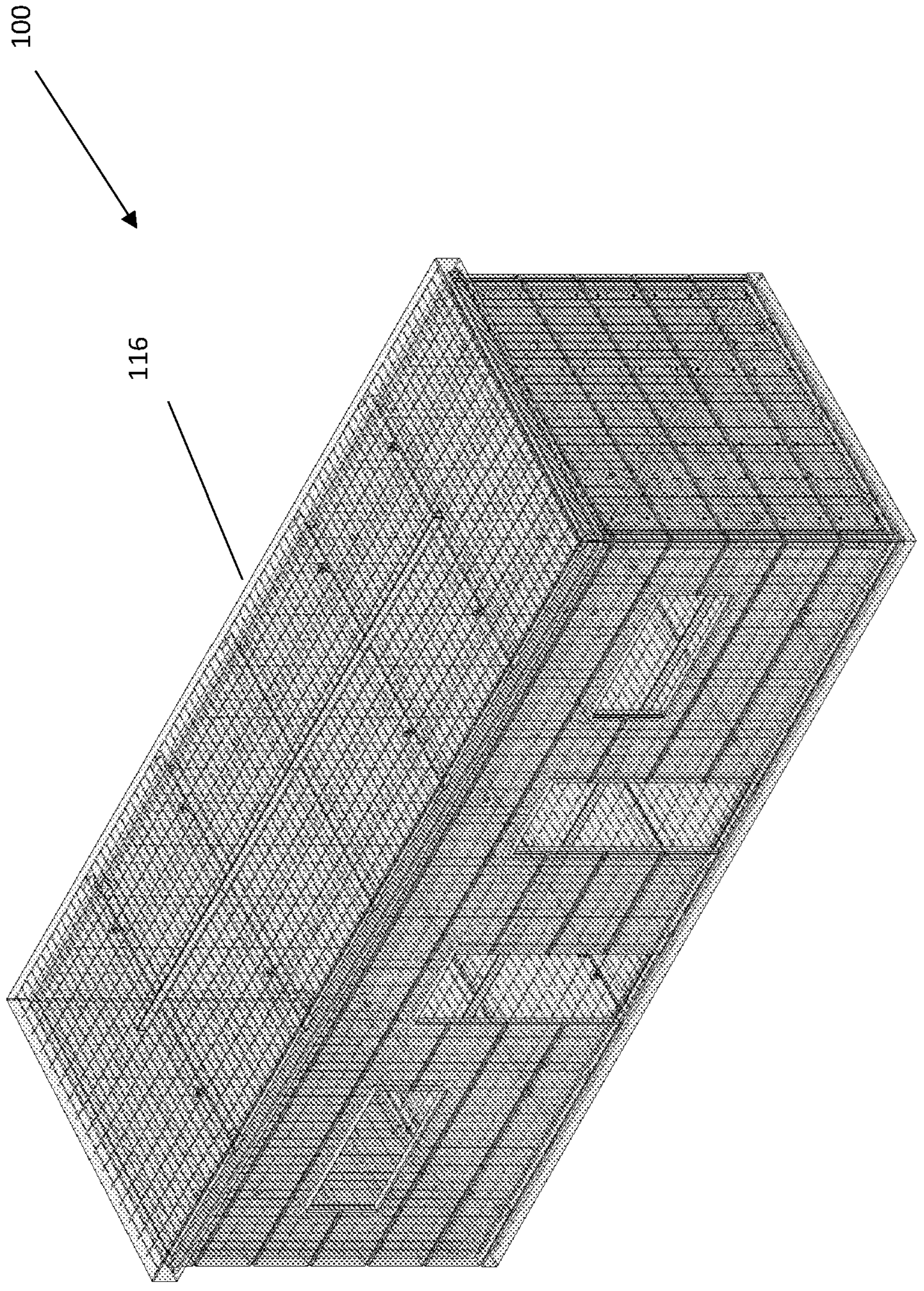
FIG. 2 shows reinforcement structures within the pre-cast panels of the building structure of FIG. 1.

Each precast concrete panel 102, 106, 108, 110, 112, 114 comprises a reinforcement structure 116 that is illustrated in FIG. 2. The reinforcement structure 116 has the function of reinforcing strength of each panel and may further be used to attach lifting elements, mesh chairs or other structural elements of the panel, such as internal threads. A reinforcement structure 116 is typically made of steel and positioned in a casting bed, for example, supported on mesh chairs, before the concrete is poured into the casting bed to make the panel. More specific details on the Applicant's precast panels, reinforcement structure and mesh chairs can be found in international patent application No. WO2015154132 which is herein incorporated in its entirety by reference.

Figure 3A:
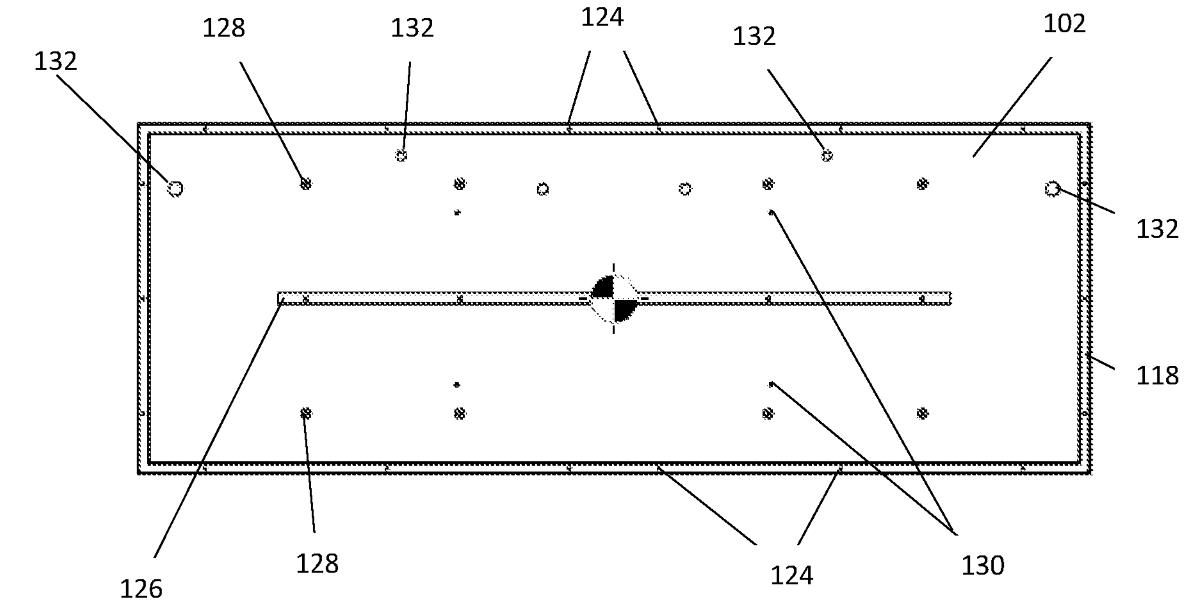
FIGS. 3A 3B and 3C show different views of a pre-cast floor panel of the building structure of FIG. 1.
Figure 3B:
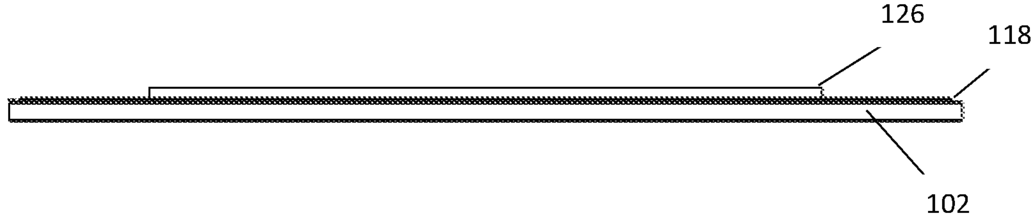
Figure 3C:
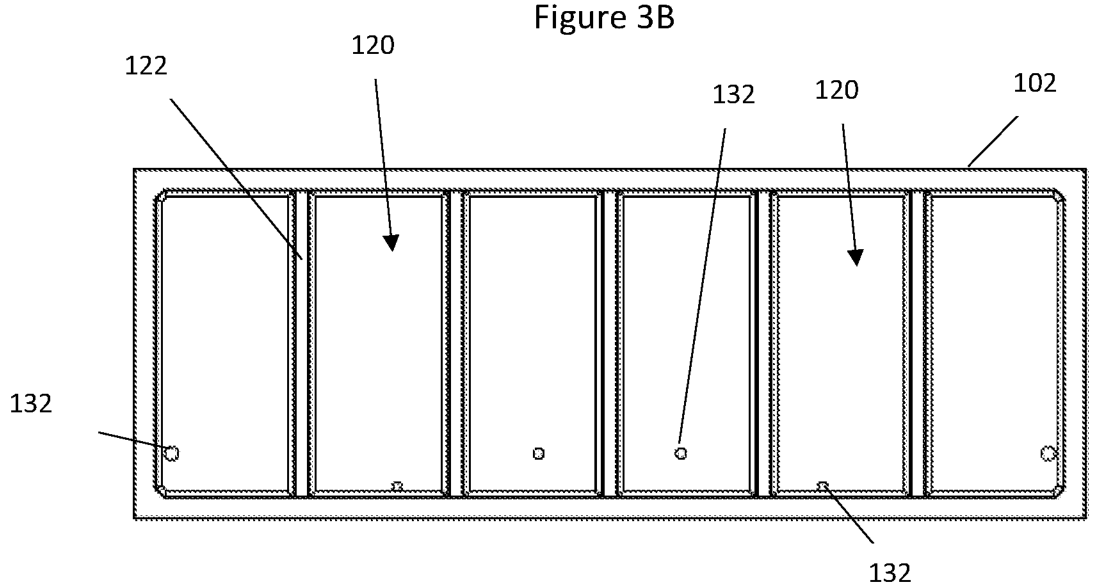

Referring now to FIGS. 3 and 4, different schematic views of the floor panel 102 of the building system 100 are illustrated. Specifically, FIG. 3A shows a top view of the floor panel 102 that will face upwards when the building structure 101 is erected. FIG. 3B shows a side view of the floor panel 102 and FIG. 3C shows a bottom view of the floor panel 102 that is supported by the plurality of footings 104, 105. However, a person skilled in the art will appreciate that other footings or building foundations are envisaged.

The floor panel 102 comprises a recess 118 that extends along the entire perimeter of a top face of the floor panel 102. However, a person skilled in the art will appreciate that the recess 118 may only extend along a portion of the perimeter. The recess 118 is sized and shaped so that the plurality of precast concrete wall panels 106, 108, 110 and 112 can be positioned in the recess 118 to extend in a substantially upright manner. In this regard, the recess 118 has a width similar to a width of each of the wall panels 106, 108, 110 and 112. Once the plurality of wall panels 106, 108, 110, 112 are positioned in a substantially upright manner in the recess 118 of the floor panel 102, each panel 106, 108,110, 112 may be supported by one or more props (not shown) that are temporarily attachable to the panels 106, 108, 110, 112 and anchored to the anchoring elements 130 of the floor panel 102.

The floor panel 102 further comprises a recessed area 120 at a bottom face of the floor panel 102 as shown in particular in FIG. 3C. By providing a recessed area 120 where the concrete of the floor panel 102 has been displaced, a weight of the floor panel 102 can be reduced. In addition, in order to improve strength of the floor panel 102, the precast concrete floor panel 102 comprises a plurality of structural ribs 122 extending through the recessed area 120. In this particular example, the floor panel 102 comprises five structural ribs 122 extending along a short side of the rectangular floor panel 102 thereby defining six recessed areas. However, a person skilled in the art will appreciate that the ribs may extend in any direction and for example form a grid-like structure.

Figure 4A:
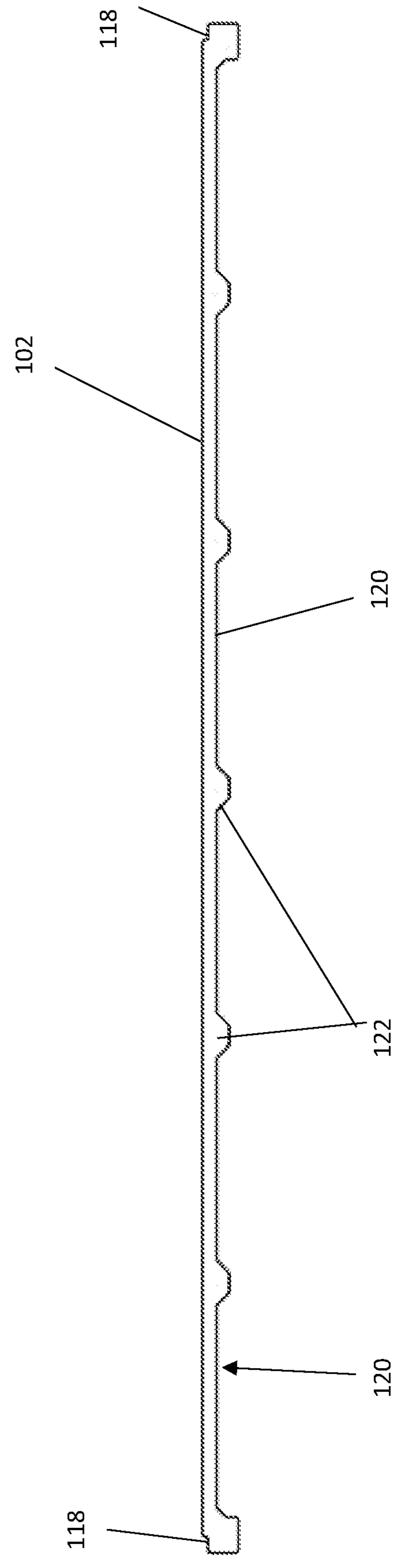
FIGS. 4A and 4B are schematic representations of the floor panel showing the recess area at the centre portion of the floor panel.
Figure 4B:
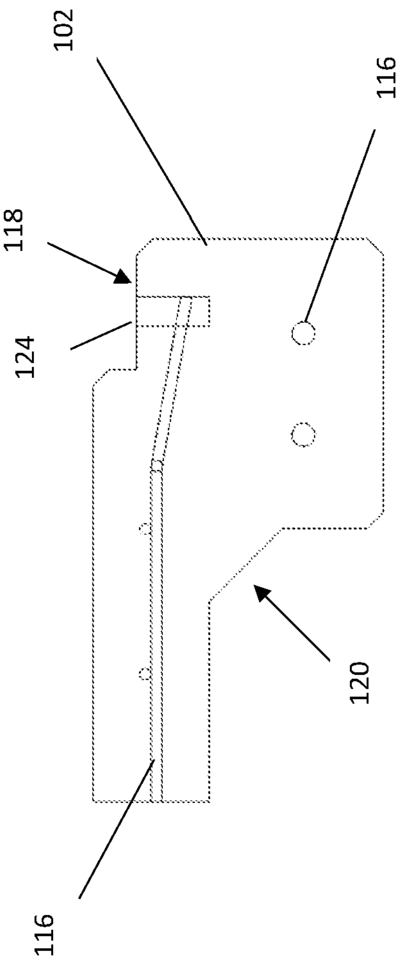

FIGS. 4A and 4B show a more detailed cut through view along the floor panel 102 to illustrate the recess 118 along the perimeter and the recessed areas 120 with the structural ribs 122.

The floor panel 102 further comprises a plurality of cast-in connecting inserts, in this example threaded inserts 124, that are located at pre-determined positions. The positions of the threaded inserts 124 are determined so that the floor panel 102 can be connected to each of the plurality of wall panels 106, 108, 110, 112 using connecting brackets 164 as will be illustrated further below. In this example, each of the threaded inserts 124 comprises closed ends in the form of an enlarged footing. Such threaded inserts 124 are typically referred to as elephant ferrules. Elephant ferrules have the advantage of improved stability when cast into a concrete panel. A person skilled in the art will appreciate that other connecting inserts, such as threaded inserts, within the panel 102 are envisaged. For example, the threaded inserts may go through the panel thereby defining threaded apertures for receiving fasteners.

The precise positioning of the internal threads 124 relative to the casted floor panel 102 allows, amongst others, fora simplified assembling process of the business structure 101. Once the wall panels 106, 108, 110, 112 are positioned within the recess 118 of the floor panel 102, the internal threads 124 of the floor panel 102 are located to align with threaded inserts or apertures of the adjacent wall panel so that a connecting bracket and a fastener, or only a fastener can be fastened to the internal threads 124 to connect the panels to each other.

Figure 8:
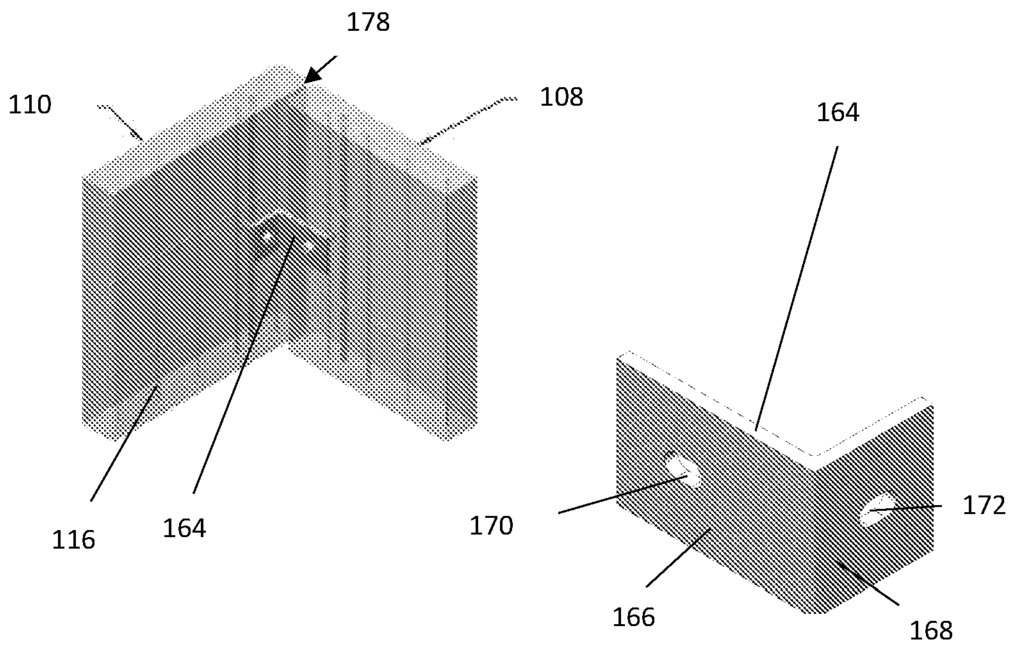
FIG. 8 is an isometric representation of a connection between two adjoining precast wall panels of the building structure of FIG. 1.

In this example, the plurality of threaded inserts 124 are located in the recess 118 along the perimeter of the floor panel 102. In this way, a first plate 166 of a connecting bracket 164 as exemplarily shown in FIG. 8 is fastened to the threaded inserts 124 of the floor panel 102, before the wall panels 106, 108, 110, 112 are positioned in the recess 118. In this regard, each wall panel 106, 108, 110, 112 may comprise a recess arranged and sized to receive and thereby conceal the plate 166 of the connecting bracket 164 as will also be further illustrated below. A person skilled in the art will appreciate that the threaded inserts 124 may alternatively be located outside of the recess 118 so that the connecting bracket 164 is fastened to adjacent panels after the wall panel 106, 108, 110, 112 has been positioned in the recess 118.

The floor panel 102 further comprises a number of elements, such as a temporary rib 126 for providing strength when lifting the panel 102 (also referred to as strongback), lifting elements 128 to facilitate lifting of the panel 102, anchoring elements 130 for attaching to a temporary support such as a steel prop when the wall panels are positioned, and apertures 132 of various sizes and positions. The apertures 132 as shown in this example have the function of providing access for elements of an electrical and/or plumbing system.

The floor panel 102 may further comprise a plurality of indentations (not shown) that are provided at the bottom face of the floor panel 102. Each indentation is positioned and shaped to receive a top portion of a selected footing, such as footing 104, 105. The plurality of indentations may thereby assist in aligning the floor panel 102 with the plurality of footings 104, 105 when the building structure 101 is erected.

Figure 5A:
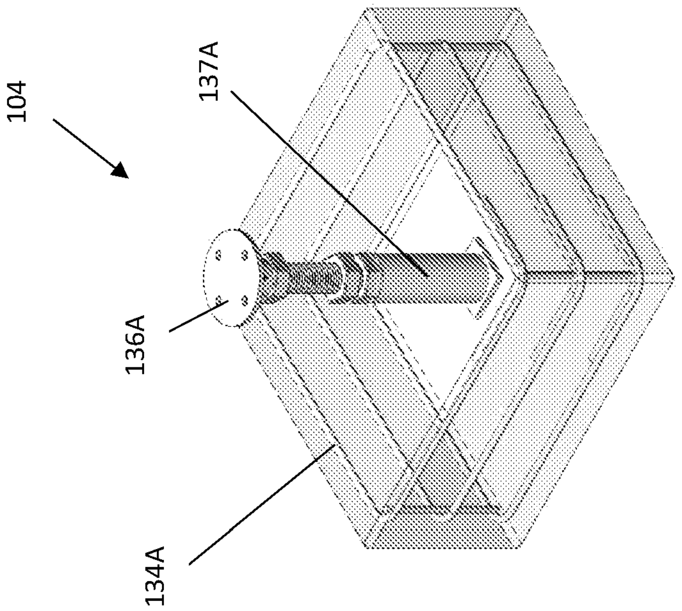
FIGS. 5A and 5B are schematic representations of two different footings suitable for the building structure of FIG. 1.
Figure 5B:
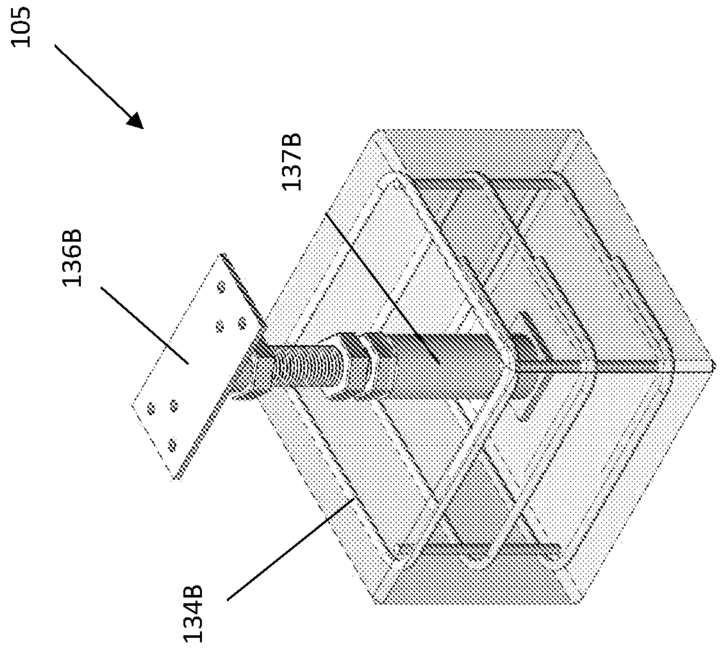

Referring now to FIGS. 5A and 5B, there is shown schematic illustrations of footing 104 and footing 105. Each footing 104, 105 is a precast concrete footing including a reinforcement structure 134, in this example in the form of a steel cage 134A, 134B. The footing 104, 105 further comprises a foot 136A, 136B that is adjustable in height by virtue of a threaded configuration 137A, 137B. In this way, a height of the foot 136 of each footing 104, 105 can be adjusted to adjust a level of the floor panel 102. This is particularly advantageous for uneven ground surfaces.

As shown in FIG. 1, each footing 104, 105 may comprise more than one adjustable foot 136A, 136B. This may be particularly advantageous if other building structures, such as a veranda or stairs, are provided at the front wall panel 104.

Figure 6A:
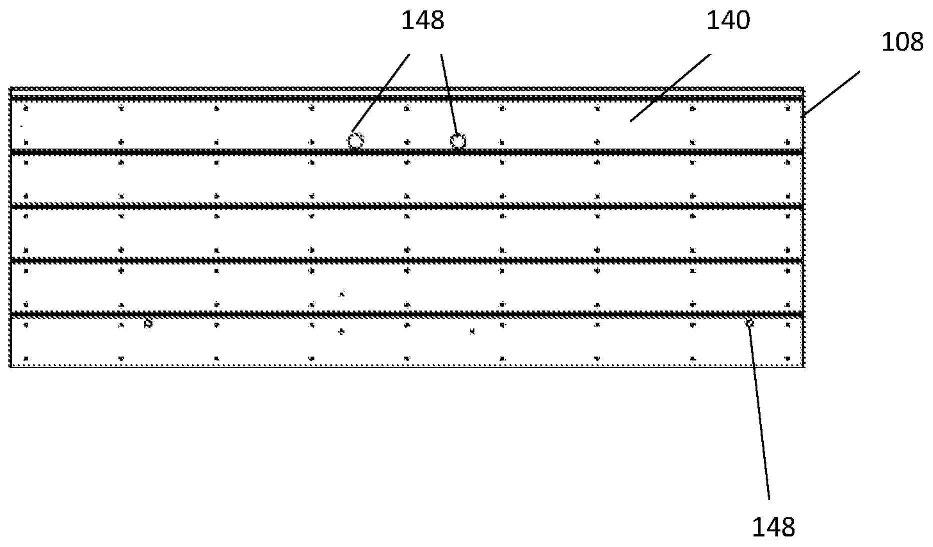
FIGS. 6A, 6B and 6C are schematic representations of a wall panel of a building structure of FIG. 1.
Figure 6B:
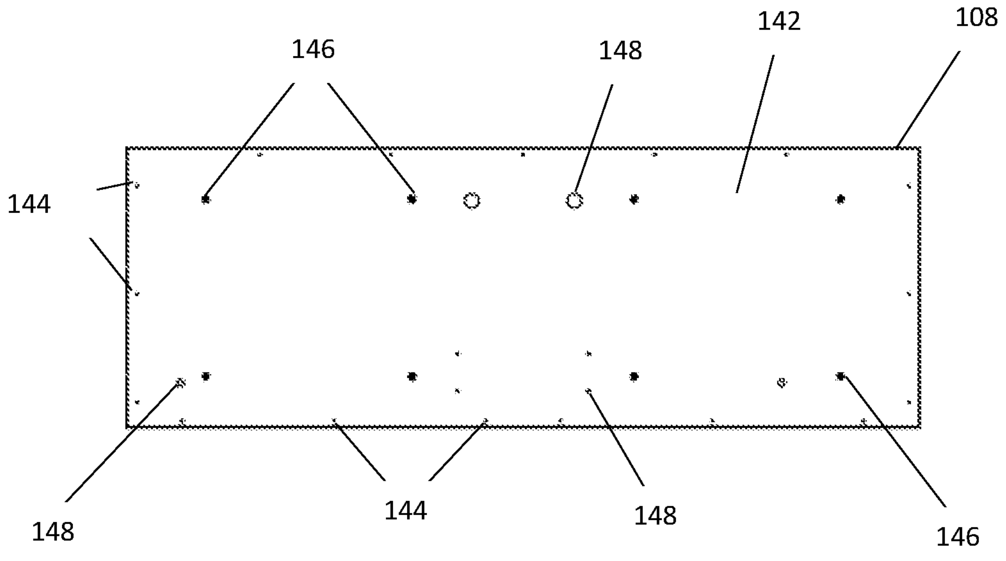
Figure 6C:
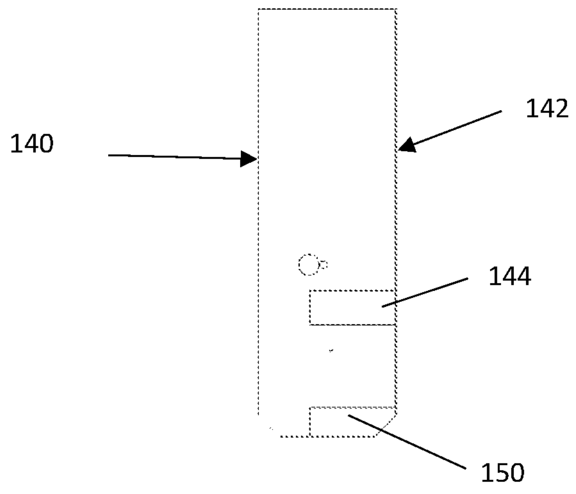

Referring now to FIG. 6, there is shown three different views of the back wall panel 108 of the building structure 101. Specifically, FIG. 6A shows an external face 140 of the back wall panel 108, FIG. 6B shows an internal face 142 of the back wall panel 108, and FIG. 6C shows an exemplary cast-in threaded insert 144.

Similar to the floor panel 102, the precast concrete back wall panel 108 comprises a plurality of connecting inserts, in this example threaded inserts 144, that are positioned at predetermined positions in a manner to align with connecting inserts, such as cast-in threaded inserts, of an adjoining side wall panel 110, 112 and the floor panel 102, respectively. The threaded inserts 144 in this example are elephant ferrules with a closed end and an enlarged footing. In this particular embodiment, the threaded inserts 144 are positioned within the wall panel 108 with the aid of support elements that are attached to the casting bed (not shown) as will be described in further detail below. However, a person skilled in the art will appreciate that other methods of positioning the threaded inserts 144 at the predetermined positions are envisaged. For example, the threaded inserts 144 may comprise an attachment for attaching the threaded inserts to the reinforcement structure 116. Additionally or alternatively, the threaded inserts 144 may comprise a plurality of legs for positioning the threaded inserts 144 in the casting bed when the panel is cast, similar to the mesh chairs.

Similar to the floor panel 102, the wall panel 108 further comprises features, such as a plurality of lifting elements 146 and a plurality of apertures 148 for providing access, for example for elements of an electrical or plumbing system.

Referring in particular to FIG. 6C, the wall panel 108 further comprises a recess 150 located at a bottom edge of the internal face 140 of the wall panel 108 where the wall panel 108 is connected to the floor panel 102. The recess 150 is located to substantially align with the threaded insert 144 and is shaped and sized to receive a plate 168 of a connecting bracket 164. As briefly described above, before the wall panel 108 is connected to the floor panel 102, a first plate 166 of a connecting bracket 164 is fastened to the threaded insert in the recess 118 of the floor panel 102 so that a second plate 168 of the connecting bracket 164 extends upwardly from the floor panel 102. The wall panel 108 is then positioned such that the upwardly extending plate 168 of the connecting bracket 164 is received within the recess 150 of the wall panel 108. In this way, the connecting bracket 164 can be concealed when the building structure 100 is erected.

Figure 7:
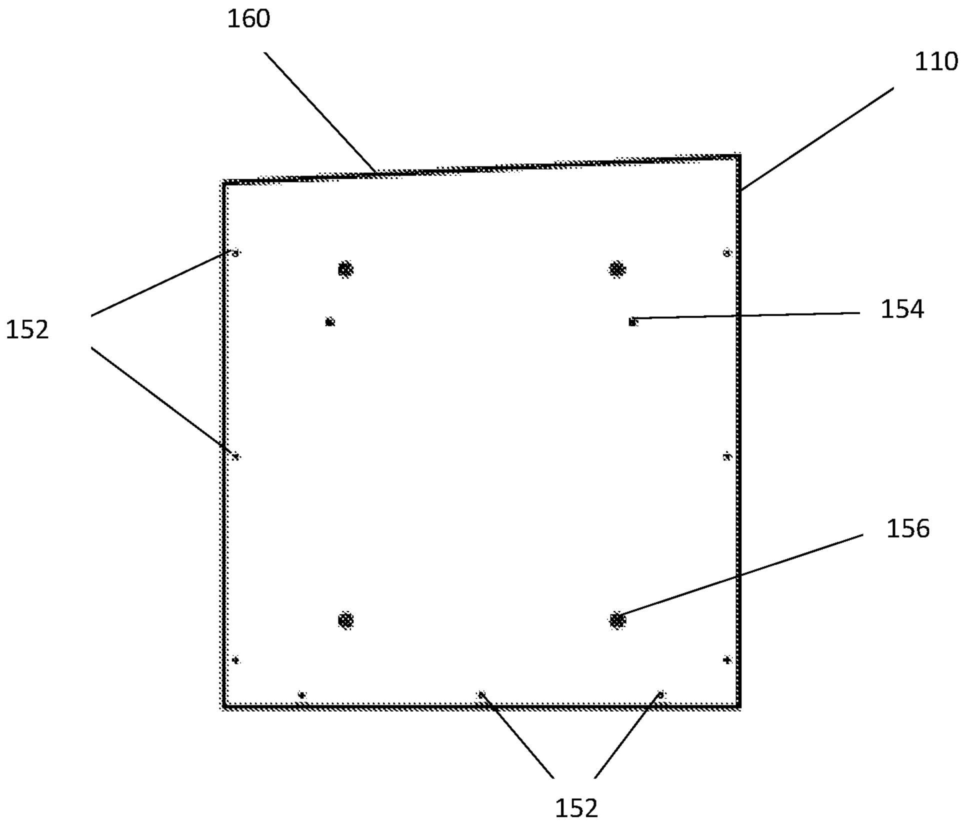
FIG. 7 is a schematic representation of a precast sidewall panel of the prefabricated building structure of FIG. 1.

FIG. 7 shows an example of the precast concrete side wall panel 110. Similar to the back wall panel 108, the side wall panel 110 comprises a plurality of threaded inserts 152, ferrules 154 for attaching one or more temporary props, lifting elements (not shown) and a plurality of apertures 156 for the electrical or plumbing system.

Furthermore, the exemplary side wall panel 110 is shaped so that when the roof panel 114 is connected to the side wall panel 110, an external surface of the roof panel 114 extends at a slope thereby allowing water, such as rain, and other debris to flow off the roof panel 114. Specifically, a top edge 160 of the side wall panel 110 extends at a defined slope. This is particularly advantageous if the building system 100 also comprises a precast concrete roof panel 114 as will be described in further detail below. A person skilled in the art will appreciate that in other examples the top edge 160 of the side wall panel 110 may extend in a substantially horizontal direction.

Figure 9:
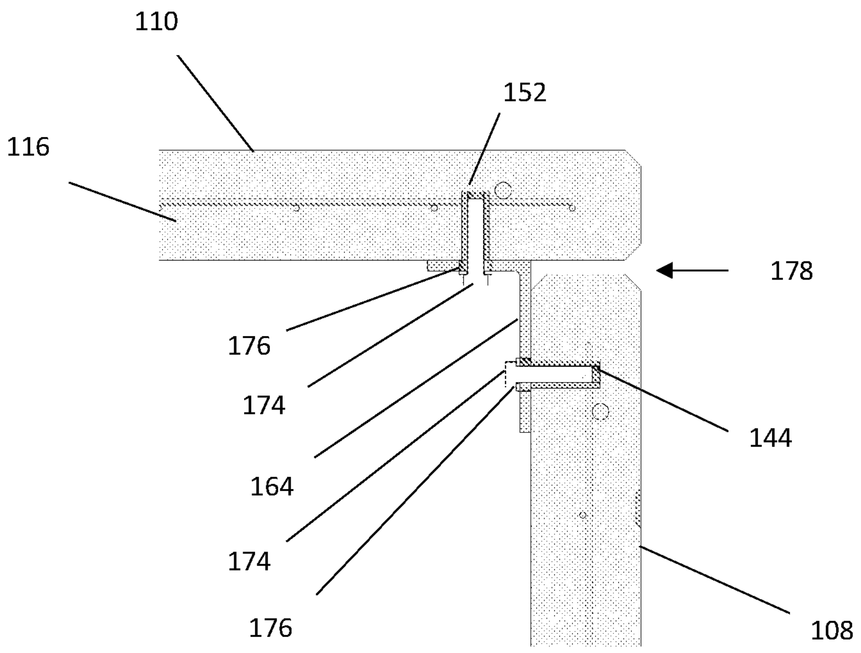
FIG. 9 is a top view of the two adjoining precast wall panels of FIG. 8.

Referring now to FIG. 8, there are shown isometric representations of a connection between two adjacent concrete panels, such as back wall panel 108 and side wall panel 110 or back wall panel 108 and floor panel 102. FIG. 9 shows a top view of this connection. In general, adjacent panels are connected by fastening one or more connecting brackets 164 to threaded inserts of the respective panels using suitable mechanical fasteners, such as bolts. In this particular example and as shown in an exploded view in FIG. 8, the connecting bracket 164 comprises a first plate 166 and a second plate 168. Each plate 166, 168 comprises at least one aperture 170, 172 for receiving a mechanical fastener, such as a bolt 174 and a washer plate 176. In this particular example, the plates 166, 168 are of identical size and shape and are arranged at a substantially rectangular angle to each other. In this embodiment, each plate 166, 168 comprises one aperture in the shape of a slot to provide for some tolerance when the building system 100 is assembled to erect the building structure 101. However, a person skilled in the art will appreciate that each plate may have more than one aperture and that the aperture may have any suitable shape, such as an enlarged diameter to account for tolerances.

Furthermore, in this example the building system 100 is configured such that the plurality of connecting brackets 164 to connect pre-cast concrete panels are substantially identical. In other words, any one of the plurality of connecting brackets 164 can be used to connect any two adjacent panels, irrespective of whether the panel is a wall panel, a floor panel or a roof panel. This has the significant advantage that the process of erecting the building structure 101 can be simplified as there is no need to identify a particular bracket for a specific purpose.

When two adjoining panels are connected as shown in FIGS. 8 and 9, a tolerance in the form of a gap 178 is typically provided between the panels 108, 110. The gap 178 in this example is between 5-8 mm in width. Once the building structure 101 is erected, this gap 178 may be filled with a filling material, such as grout which is a good fire-retardant material.

While in this example the precast panels 102, 106, 108, 110, 112, 114 are connected using angle brackets 164, a person skilled in the art will appreciated that other ways of connecting the panels using mechanical fasteners are envisaged.

For example, a plurality of connecting inserts of the floor panel 102 and/or the roof panel 114 and/or one or more of the wall panels 106, 108, 110, 112 may be in the form of apertures extending through the panel. An aperture may or may not have a thread. In this regard, the building system 100 may be configured such that when the building structure 101 is erected, an aperture of a first panel aligns with a threaded insert having a closed end of a second panel, irrespective of whether the panel is a roof panel, a floor panel or a wall panel. For example, the floor panel may comprise a plurality of threaded inserts with a closed end, and a wall panel to be connected to the floor panel comprises a plurality of connecting inserts in the form of apertures, each extending through the wall panel. When the building structure is erected, an aperture of the wall panel aligns with a threaded insert of the floor panel so that a mechanical fastener, such as a bolt with an enlarged head can extend through the aperture and fasten to the threaded insert.

Figure 10A:
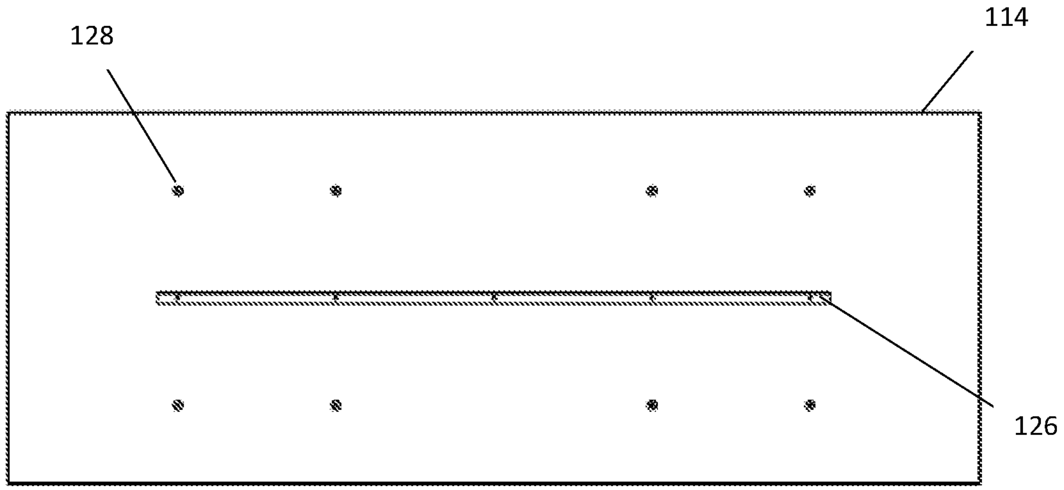
FIGS. 10A, 10B and 10C show different views of a pre-cast roof panel of the building structure of FIG. 1.
Figure 10B:
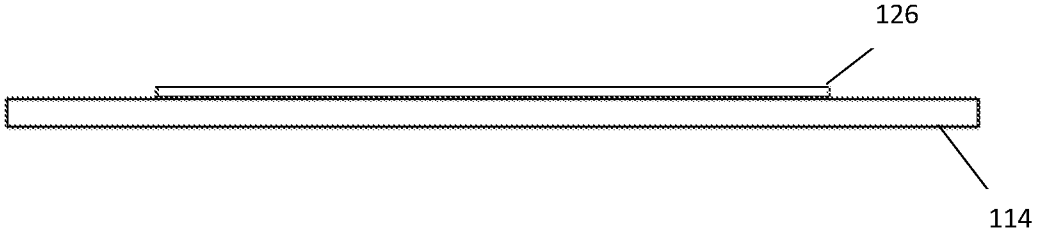

Referring back to the building system 100 as shown in FIG. 1, the building structure 101 comprises a precast concrete roof panel 114. Different views of the roof panel 114 are illustrated in FIGS. 10A, 10B and 100. Specifically, FIG. 10A shows a top view of the roof panel 114 that will face upwards when the building system 100 is assembled. FIG. 10B shows a side view of the roof panel 114 and FIG. 3C shows a bottom view of the roof panel 114 that will define the ceiling of the internal space of the building structure 101.

Figure 10C:
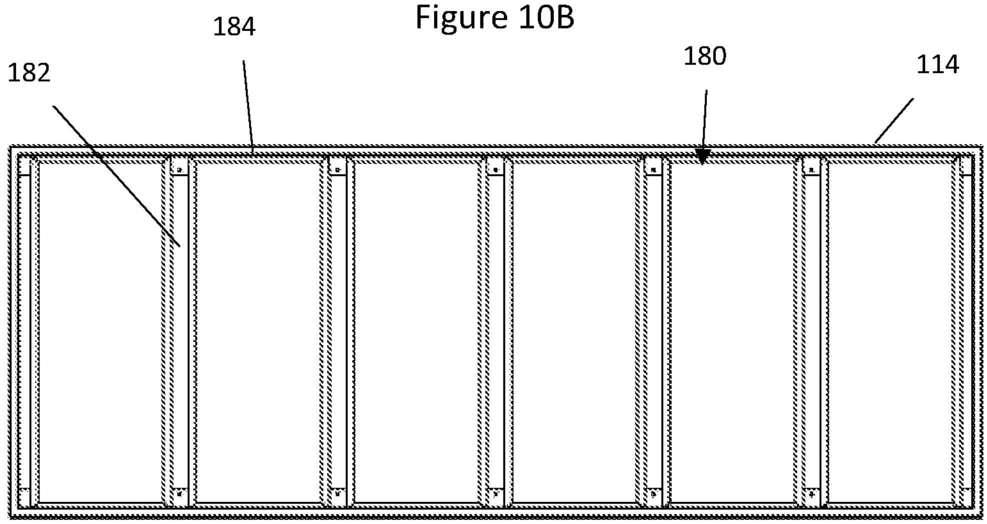

Similar to the floor panel 102, the precast concrete roof panel 114 comprises a recessed area 180 located at a bottom face of the roof panel 114 as shown in FIG. 10C. By providing a recessed area 180 where the concrete has been displaced, a weight can be reduced which is particularly advantageous for the roof panel 114 as it needs to be fully supported by the wall panels 106, 108, 110, 112. In order to improve a strength of the roof panel 114, in this example the precast roof panel 114 also comprises a plurality of structural ribs 182 extending through the recessed area 180.

Figure 12:
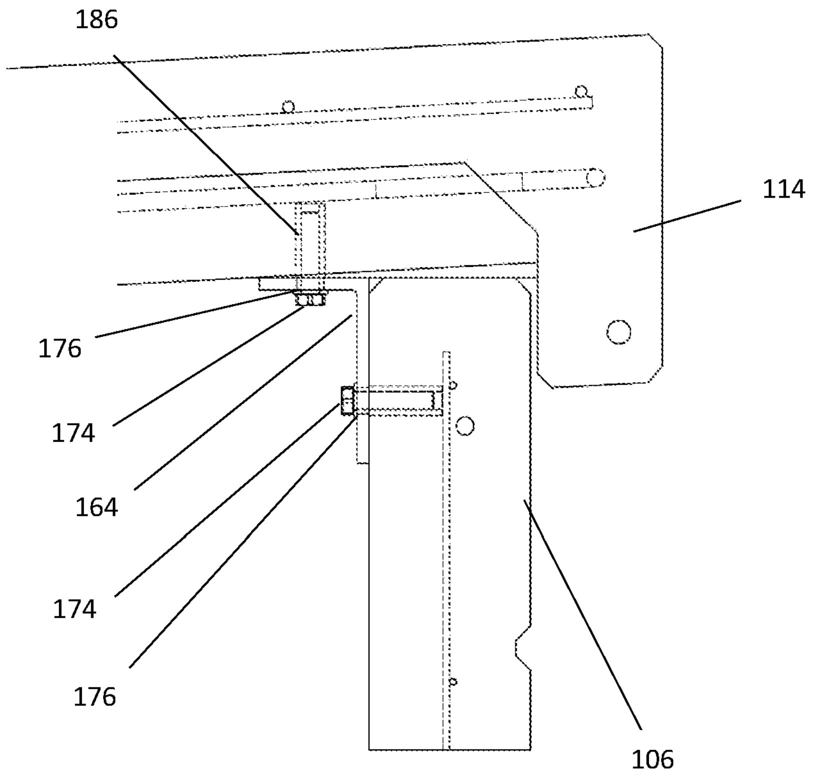
FIG. 12 is a schematic representation of a connection between a wall panel and the roof panel of the building structure of FIG. 1.

In this example, the roof panel 114 comprises five structural ribs 182 extending along the short side of the roof panel 114 thereby defining six recessed areas 180. The recessed areas 180 are configured such that edges of the roof panel 114 form flanges 184 that protrude along the perimeter from the roof panel 114. In this way, a roof overlap can be formed. In other words, the roof panel 114 forms a lid that caps off the top ends of the wall panels 106, 108, 110, 112 when the building structure 101 is erected as shown in FIG. 12.

Specifically, the building system 100 is configured such that when the wall panels 106, 108, 110, 112 are positioned in a substantially upright position, a surface of the recessed areas 180 rests on the top ends of the wall panels 106, 108, 110, 112 and the projecting flange 184 extends along an outer portion of the wall panels 106, 108, 110, 112. This configuration has multiple advantages. For example, a strength of the building structure can be improved, and water such as rain can flow off the roof panel 114 without being able to flow inside of the building structure 101.

Similar to the floor panel 102 and the wall panels 106, 108, 110, 112, the precast concrete roof panel 114 also comprises a plurality of connecting inserts, in this example threaded inserts 186, that are positioned within the recessed areas 180. However, in this particular example, the plurality of threaded inserts 186 are attached to the reinforcement structure 116 when the roof panel 114 is cast. The threaded inserts 186 are in the form of elephant ferrules that are positioned at an internal face of the roof panel 114. This has the advantage that the roof panel 114 can be provided with a smooth external surface.

The precast concrete roof panel 114 is further configured such that when the building structure 101 is erected, an external surface of the roof panel 114 is sloped, in this particular example by 3°. In other words, the roof panel 114 provides for an inbuilt slope that functions as a drain for water, such as rain, and other debris. Thus, any water, such as rain, can flow off the roof. In this embodiment, the slope extends in a direction so that water flows off at a back portion of the building structure 101 where the back wall panel 108 is located. While this particular embodiment provides for a 3° slope, a person skilled in the art will appreciate that any suitable angle is envisaged, such as between 1° and 10°, in particular between 1° and 5°, in particular between 2° and 3°, or approximately 1°, 2°, 3°, 4°, or 5°.

Figure 11A:
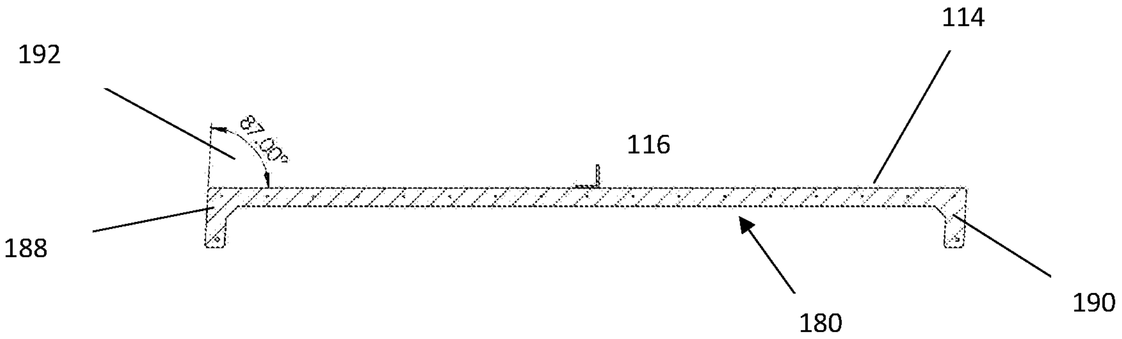
FIGS. 11A, 11B, and 11C are schematic representations of the roof panel of the building structure of FIG. 1 showing structural details of the roof panel.
Figure 11B:
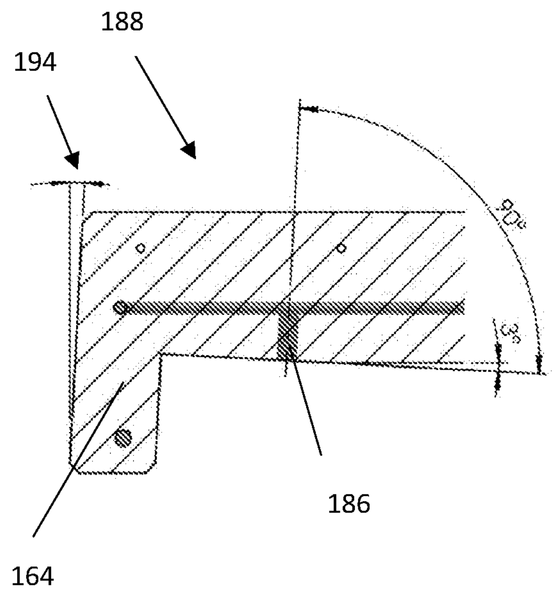
Figure 11C:
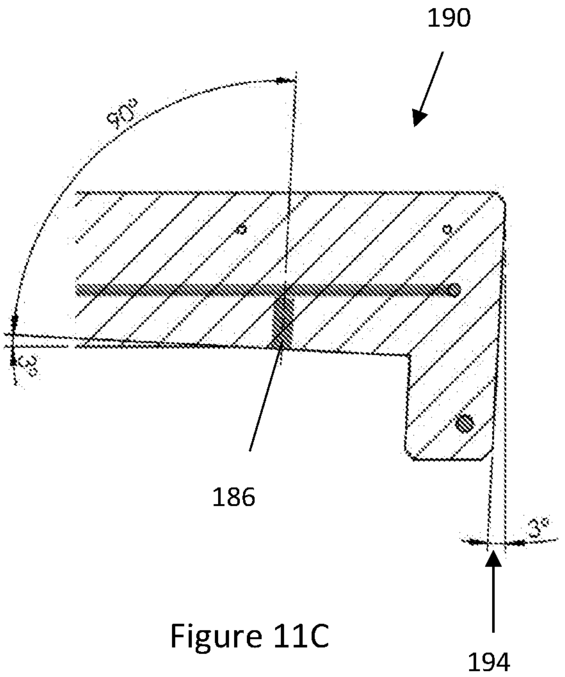

The configuration of the roof panel 114 to provide the sloped external surface area is further illustrated in FIGS. 11A, 11B and 11C. It should be noted that in this particular example, the configuration of the roof panel 114 is achieved by specific process steps of the casting process. In particular, displacement elements may be attached to side walls of the casting bed to cast the roof panel 114 as shown in the Figures.

The roof panel 114 comprises a first end 188 that forms the lower end of the roof panel 114 which will be supported by the back wall panel 108, and a second end 190 that forms the higher end of the roof panel 114 which will be supported by the front wall panel 106. This is achieved by changing the angle between the flange 184 and the external surface area of the roof panel 114 while keeping the internal angle between the flange 184 and the recessed area at substantially 90°. In FIG. 11A, this is illustrated by angle 192 of 87° between the external surface area of the roof panel 114 and a plane defined by the flange 184. In FIGS. 11B and 110, the slope angle 194 of 3° is illustrated by comparing an angle of the flange 184 with an angle of the flange of a roof panel without a slope.

Figure 13:
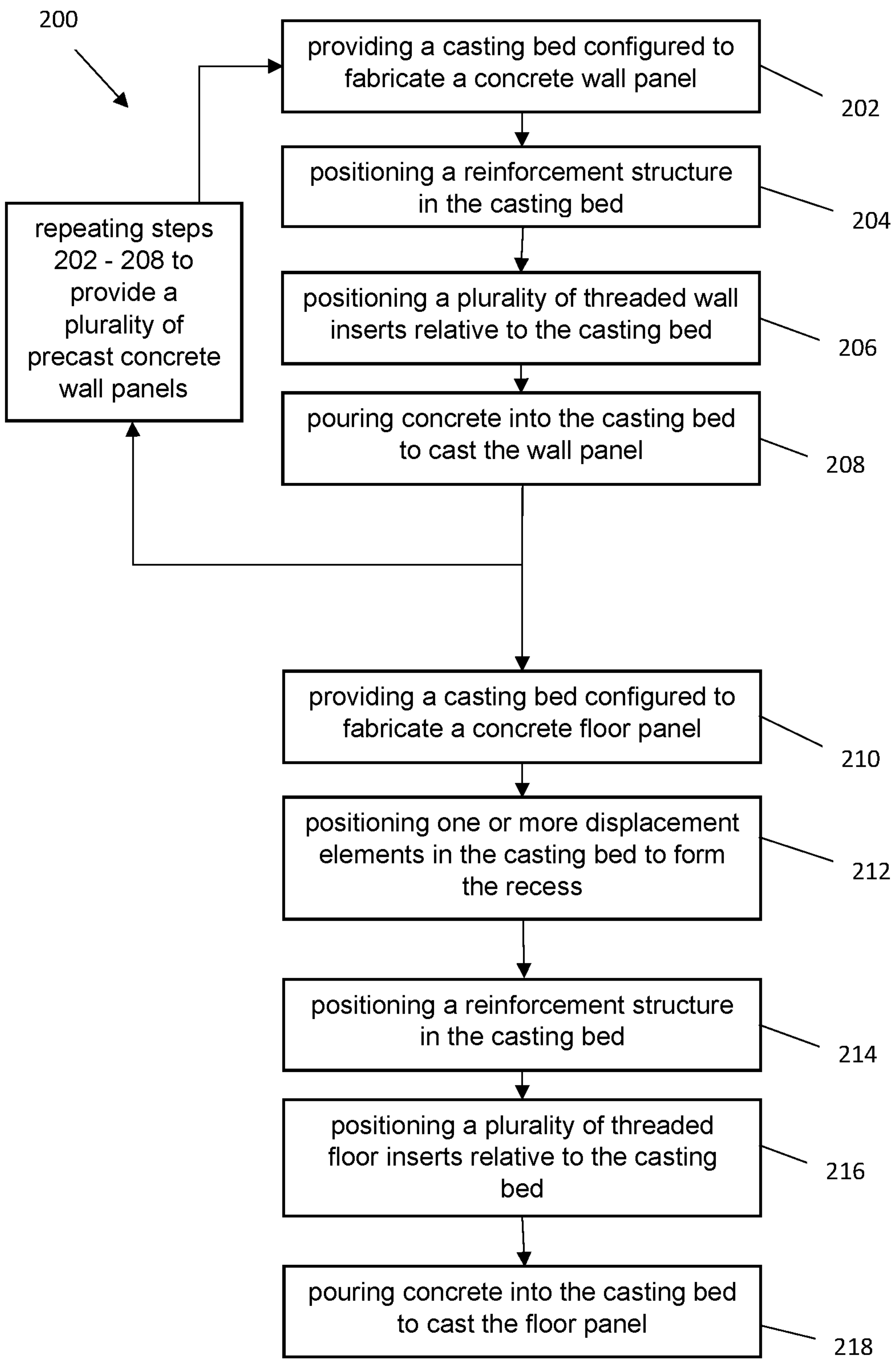
FIG. 13 is a flow chart illustrating a method of making a prefabricated building structure in accordance with an embodiment of the present invention.

Referring now to FIG. 13, there is shown a flow chart illustrating a method 200 of making a pre-fabricated transportable building structure, such as building structure 101 of building system 100 shown in the foregoing figures.

The method 200 comprises an initial step 202 of providing a casting bed configured to fabricate a concrete wall panel. In a further step 204, a reinforcement structure is placed in the casting bed. The reinforcement structure may for example be a reinforcement grid made of steel. The reinforcement structure may be supported by chairs to lift the reinforcement structure off a bottom surface of the casting bed.

The method 200 also comprises a step of positioning 206 a plurality of threaded inserts relative to the casting bed. The threaded inserts are configured to receive fasteners to fasten one or more connecting brackets to the fabricated wall panel. The step of positioning the plurality of threaded inserts relative to the casting bed is conducted such that when the wall panel is cast, each of the threaded inserts is located at a predetermined position within the wall panel. The predetermined position is defined so that when wall panels or a wall panel and a floor or roof panel are positioned, connecting brackets can be fastened to the internal threads to connect the two adjoining panels. In a further step 208 concrete or other similar hardening material is poured into the casting bed to cast the wall panel.

Steps 202 to 208 are repeated to provide a plurality of precast concrete wall panels for the building structure. In the example shown in FIGS. 1 to 12, the building structure 101 comprises four different wall panels. As such, steps 202 to 208 are repeated four times to provide the wall panels. In this regard, different casting beds may be provided to fabricate the different shapes, sizes and configurations of the wall panels.

In this particular example, the method 200 further comprises a step 210 of providing a casting bed configured to fabricate a concrete floor panel. The casting bed is configured to provide a recess along at least a portion of a perimeter of the casted floor panel. This may be achieved by providing a specifically designed casting bed. Alternatively, the method 200 may comprise a step of positioning 212 one or more displacement elements in the casting bed to form the recess.

As for the wall panels, the method 200 further comprises a step 214 of positioning a reinforcement structure in the casting bed, a step 216 of positioning a plurality of threaded inserts relative to the casting bed, and a subsequent step 218 of pouring concrete into the casting bed to cast the floor panel.

The method 200 is conducted such that when the building structure is erected, each precast wall panel can be positioned in the recess of the floor panel and the threaded inserts of two adjoining panels are positioned to align so that the floor panel and the wall panels can be connected to each other using a plurality of connecting brackets.

In the example above in which the building structure 101 also comprises a precast concrete roof panel, the method may also comprise a step of providing a casting bed configured to fabricate the roof panel. This step is also followed by positioning a reinforcement structure, positioning a plurality of internal threads and pouring concrete into the casting bed.

In a specific embodiment, the method 200 comprises a step of providing at least one support structure for attaching to the casting bed, wherein the support structure is configured to support one or more threaded inserts to allow precise positioning of the threaded inserts within the panel. For example, at least one support structure may be provided to attach to a side portion of the casting bed. Thus, at least four support structures may be attached to the casting bed, each supporting a plurality of internal threads. In this way, when the panel is cast, the internal threads can be positioned at the predetermined positions at a top surface of the panel when the panel is cast. The support structure is temporarily attached to the casting bed and can be removed once the casting process is completed. The support structure may be made of any suitable material, including timber, plastics, metal or the like. The support structure may alternatively be configured as a frame enclosing edges of the casting bed. The frame may be dismantled in separate side pieces so that handling of the support structure is simplified.

In the example described above, the floor panel and the roof panel both have a recessed area. In this regard, the method 200 may comprise a step of attaching one or more displacement elements in the casting bed. In this way, the resulting concrete panel includes a recessed area at the centre position. The method 200 may further comprise a step of removing the displacement elements once the casting process has been completed. Alternatively, the displacement elements may remain in the casted panel, for example, for insulation purposes. An exemplary displacement element may for example be made of a lightweight material, such as foam. However, other suitable displacement elements are envisaged.

In the above described example, the roof panel defines a slope when the building structure is erected. In this regard, the method 200 may comprise a step of providing a first displacement element and attaching the first displacement element to a first side of the casting bed configured to fabricate the concrete roof panel. The first displacement element has the function of modifying an angle of a side of the casted roof panel. The method further comprises a step of providing a second displacement element and attaching the second displacement element to a second side portion of the casting bed configured to fabricate the concrete roof panel, the second side being opposite of the first side. The second displacement element has the function of modifying an angle of the opposite side of the casted panel relative to a main face of the roof panel. An angle of the sides of the roof panel relative to the main face of the roof panel thereby define the slope.

By using the displacement elements to modify an angle of the sides of the roof panel, the roof panel can be provided with an in-built slope. Even more so, there is no need for a complex casting bed in which concrete may need to be poured at an angle to provide the slope. Instead, the slope is formed by modifying the side portions of the panel.

Other embodiments of the present invention relate to a method (not shown) of erecting the prefabricated building structure described above. The method may comprise a step of positioning a plurality of footings, such as footings shown in FIGS. 5A and 5B. The plurality of footings are typically positioned at pre-determined positions to align with the precast concrete floor panel. In some examples as described above, the floor panel comprises a plurality of indentations for aligning with the plurality of footings. Once the precast floor panel is positioned and fastened to the footings, the method may comprise a step of positioning a precast concrete wall panel in the recess of the floor panel such that the wall panel extends in a substantially upright position. In a further step, a temporary support element, such as a prop, is provided to support the wall panel in the substantially upright position. The method further comprises a step of connecting the wall panel to the floor panel by fastening one or more connecting brackets to the plurality of internal threads within the wall and floor panels. This may be achieved by using suitable fasteners, such as bolts. The foregoing steps may be repeated for all of the plurality of wall panels thereby erecting the building structure. Once the building structure has been erected, the temporary support elements can be removed.

The method may further comprise providing a roof panel for positioning on the plurality of wall panels. For example, the roof panel may also be a precast roof panel including a plurality of threaded inserts. In this example, the method may comprise a step of connecting the plurality of wall panels to the precast concrete roof panel by fastening one or more connecting brackets to the plurality of internal threads within the wall and roof panels.

It will be appreciated by persons skilled in the art that numerous variations and/or modifications may be made to the invention as shown in the specific embodiments and/or aspects without departing from the spirit or scope of the invention as broadly described. For example, it will be apparent that certain features of the invention can be combined to form further embodiments. The present embodiments and aspects are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings.

The invenetion claimed is:

1. A building system for erecting a building structure, the building system comprising:

a plurality of precast transportable concrete wall panels; each wall panel comprising a reinforcement structure and a plurality of cast-in connecting inserts, each connecting insert being located at a predetermined position;

a precast transportable concrete floor panel, the floor panel also comprising a reinforcement structure and a plurality of cast-in connecting inserts, each being located at a predetermined position, the floor panel further comprising a recess along at least a portion of a perimeter of the floor panel; and a precast transportable concrete roof panel comprising a reinforcement structure and a plurality of cast-in connecting inserts for connecting the roof panel to the wall panels, each connecting insert being located at a predetermined position;

wherein the building system is configured such that when each precast wall panel is positioned in a substantially upright position in the recess of the floor panel and the roof is positioned on top portions of the plurality of wall panels, wherein connecting inserts of two adjacent wall panels align so that the panels can be connected using a plurality of mechanical fasteners, wherein the roof panel comprises a recessed area configured such that a projecting flange is formed extending on each side and along a perimeter of the roof panel such that when the recessed area of the roof panel is supported on the top portions of the plurality of wall panels, the projecting flange extends along and parallel to an external surface of the top portions of the wall panels, and wherein when the building structure is erected, an external surface of the roof panel is inclined thereby forming a slope, an angle of the slope being defined by an angle of the projecting flange relative to the external surface of the roof panel.

2. The building system of claim 1, wherein the recess of the floor panel has a width that is substantially identical to a width of the connecting wall panel.

3. The building system of claim 1, wherein connecting inserts of the floor panel and the plurality of wall panels are in the form of threaded inserts having a closed end.

4. The building system of claim 3, comprising a plurality of connecting brackets wherein the building system is configured such that when each precast wall panel is positioned in a substantially upright position in the recess of the floor panel, threaded inserts of two adjacent panels align with a connecting bracket to be fastened to the panels using a plurality of mechanical fasteners.

5. The building system of claim 4, wherein the plurality of connecting brackets are identical.

6. The building system of claim 1, wherein a plurality of connecting inserts of the floor panel and/or a wall panel are in the form of apertures extending through the panel, wherein the building system is configured such that when each precast wall panel is positioned in a substantially upright position in the recess of the floor panel, an aperture of a first panel aligned with a threaded insert having a closed end of an adjacent second panel so that the first and second panels can be connected using a plurality of mechanical fasteners.

7. The building system of claim 1, wherein the precast concrete floor panel comprises one or more recessed areas and one or more structural ribs arranged to extend through the one or more recessed areas.

8. The building system of claim 1, wherein the pre-cast concrete roof panel comprises one or more recessed areas and one or more structural ribs extending through the one or more recessed areas.

9. The building system of claim 1, wherein each of the plurality of cast-in inserts of the roof panel has a closed end and is positioned at an internal surface of the roof panel when the building structure is erected.

10. The building system of claim 1, wherein the roof panel comprises a first end that forms a lower end of the roof panel, and a second end opposite to the first end that forms a higher end of the roof panel when the building structure is erected, wherein a wall panel supporting the first end of the roof panel is shorter in height than a wall panel supporting the second end of the roof panel.

* * * * *